United States Patent

[11] 3,571,728

[72] Inventors John J. Andrea
Marion;
Charles M. Dennison, Hiawatha, Iowa
[21] Appl. No. 834,723
[22] Filed June 19, 1969
[45] Patented Mar. 23, 1971
[73] Assignee Collins Radio Company
Cedar Rapids, Iowa

[54] FRACTIONAL FREQUENCY DIVIDER
4 Claims, 8 Drawing Figs.

[52] U.S. Cl. .......... 328/41, 328/110
[51] Int. Cl. .......... H03k 21/00
[50] Field of Search .......... 328/41, 42, 48, 109, 110; 307/225

[56] References Cited
UNITED STATES PATENTS

| | | | |
|---|---|---|---|
| 2,927,735 | 3/1960 | Scuitto .......... | 328/109X |
| 3,295,039 | 12/1966 | MacDonald et al. .......... | 328/48X |
| 3,374,359 | 3/1968 | Anderson .......... | 307/225X |

*Primary Examiner*—John S. Heyman
*Attorneys*—Robert J. Crawford and Bruce C. Lutz

ABSTRACT: A fractional frequency divider circuit comprising a pair of frequency dividers arranged in parallel and each of which divides the input signal frequency $F_s$ by an odd integer N to produce a two level output signal with an unbalanced ratio of upper to lower level time intervals. Synchronizing means control the phases of the output signals of the two frequency dividers so that during each complete cycle of output signals there are two time intervals wherein coincidence of level of the two signals occurs. Appropriate detecting means responds to such coincidence to produce an output signal of $2F_s/N$.

| A PULSE AT TIME | PRODUCES OUTPUTS AT B AND C: B | C |
|---|---|---|
| $t_1$ | 1 | 1 |
| $t_2$ | 0 | 1 |
| $t_3$ | 0 | 0 |
| $t_4$ | 1 | 1 |

| A PULSE AT TIME | PRODUCES OUTPUTS AT D AND E: D | E |
|---|---|---|
| $t_X$ | 1 | 1 |
| $t_Y$ | 0 | 0 |
| $t_Z$ | 0 | 1 |
| $t_{2Z}$ | 1 | 1 |

INVENTORS.
JOHN J. ANDREA
CHARLES M. DENNISON
BY Donald W. Phillips
ATTORNEY

INVENTORS.
JOHN J. ANDREA
CHARLES M. DENNISON
BY Donald W. Phillion
ATTORNEY

FIG. 3a →

| AT THE COUNT OF | THE BINARY COUNTERS 34 AND 35 ADVANCE TO COUNT | | |
|---|---|---|---|
| | STAGE #3 | STAGE #2 | STAGE #1 |
| * 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |

* RESET TO ZERO OF EACH OF DIVIDERS 34 AND 35 OCCURS AT COUNT OF 3 OF OTHER DIVIDER.

INVENTORS.
JOHN J. ANDREA
CHARLES M. DENNISON
BY Donald W. Phillion
ATTORNEY

FRACTIONAL FREQUENCY DIVIDER

This invention relates generally to frequency dividers and more particularly to fractional frequency dividers which employ no multipliers therein.

Most prior art fractional frequency dividers effect their frequency division by means of first multiplying the input signal frequency and then by dividing the frequency of the output signal thereof. For example, if it is desired to divide a frequency by 5/2, the frequency of the input signal is first multiplied by two and then divided by five, to produce a resultant frequency division of 2½ The use of multipliers in a frequency divider usually results in the production of sine waves at the output of the multiplier. Such sine waves in turn ordinarily must be transformed into square waves, or a two level signal, before being supplied to divider circuits which frequently are in the form of counters consisting of stages of flip-flop circuits.

Other prior art means for obtaining fractional frequency division employ the general principle of adjusting the time constants of a flip-flop circuit so that it will respond to only one cycle of the input signal to assume a first condition thereof, but will require two cycles of the input signal to assume the second stage thereof. In this manner a frequency division of 3/2 is effected.

Such circuits, however, have an inherent difficulty in that the requirements for the input signal are usually quite rigid. It is an object of the present invention to provide a fractional frequency divider which is substantially digitalized and which does not require multipliers.

A second purpose of the invention is a fractional frequency divider which requires only frequency dividing circuits.

A third aim of the invention is a digitalized fractional frequency divider which requires only divider circuits and does not require multiplier circuits.

A fourth object of the invention is a simple and reliable digitalized fractional frequency divider.

A fifth purpose of the invention is a simple and reliable digitalized fractional frequency divider which employs only frequency divider circuits.

A sixth purpose of the invention is the improvement of fractional frequency dividers generally.

In accordance with one form of the invention there is provided first and second frequency dividers each of which divides the input signal of frequency $F_s$ by the same integer N, but with the inverted form of said input signal being supplied to one of said frequency dividers. The two frequency dividers have two level output signals and are constructed to have the duty cycle of their two level outputs unbalanced. For example, 60 percent of said output signal could be at the upper level and 40 percent at the lower level. Synchronizing means are provided to originate and maintain a predetermined phase relation between the outputs of the two dividers, such that the 60 percent upper level portion of the output of said first divider symmetrically spans the 40 percent lower level of the output of the other frequency divider. Thus there exists two portions of each cycle period wherein the outputs of both frequency dividers coincide. Suitable gating means is provided to detect such coincident portions of the upper portions of said output signals to produce an output signal whose frequency is equal to; $2F_s/N$.

In accordance with a feature of the invention the frequency dividers can be multistaged binary counters. For example, the frequency dividers can be three stage binary counters with a maximum total count capacity of eight but which are constructed to reset to zero every fifth count, thus causing a frequency division of five. Further, it is possible with such an arrangement to have the last stage of said three stage binary counters contain a binary 1 for one period of the input signal and a binary 0 for the other four periods of the input signal, over a complete five count cycle. In such a case it is apparent that the duty cycle of the upper to lower levels has a ratio of one to four, where the upper level is represented by a 0.

In the foregoing feature of the invention it is necessary that some means be provided to maintain the proper phase relation between the count of said first and second frequency dividers so that the time interval during which the third stage of one of said frequency dividers contains a 1 falls substantially in the center of the four count time interval during which the third stage of the other frequency divider contains a 0. In this manner there will be obtained a situation wherein during each five cycle time interval there will be two periods of coincidence of the upper levels of the outputs of the two frequency dividers.

The above-mentioned and other objects and features of the invention will be more fully understood from the following detailed description thereof when read in conjunction with the drawings in which:

FIG. 1 is a logic diagram of one form of the invention employing JK flip-flop circuits and functioning to divide the frequency by 3/2;

FIGS. 1*a* and 1*b* are truth tables, which in conjunction with the waveforms of FIG. 2, show the relation between the counts of the two binary counters of FIG. 1;

Figure 4:
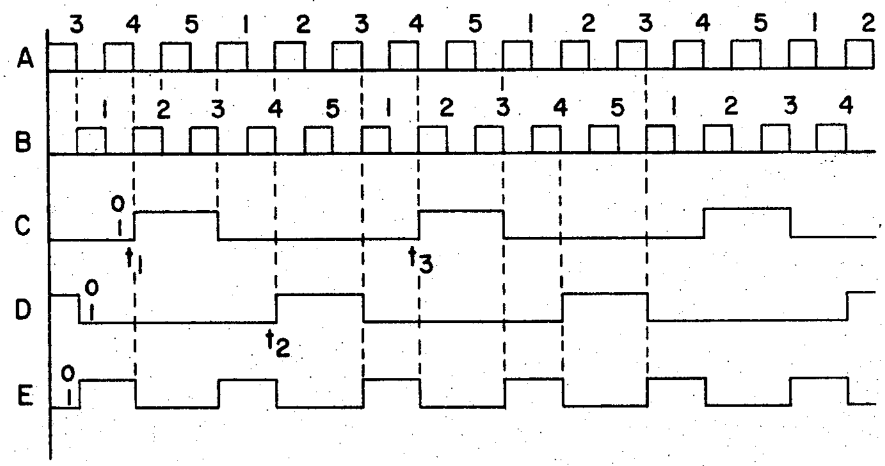
Figure 3:
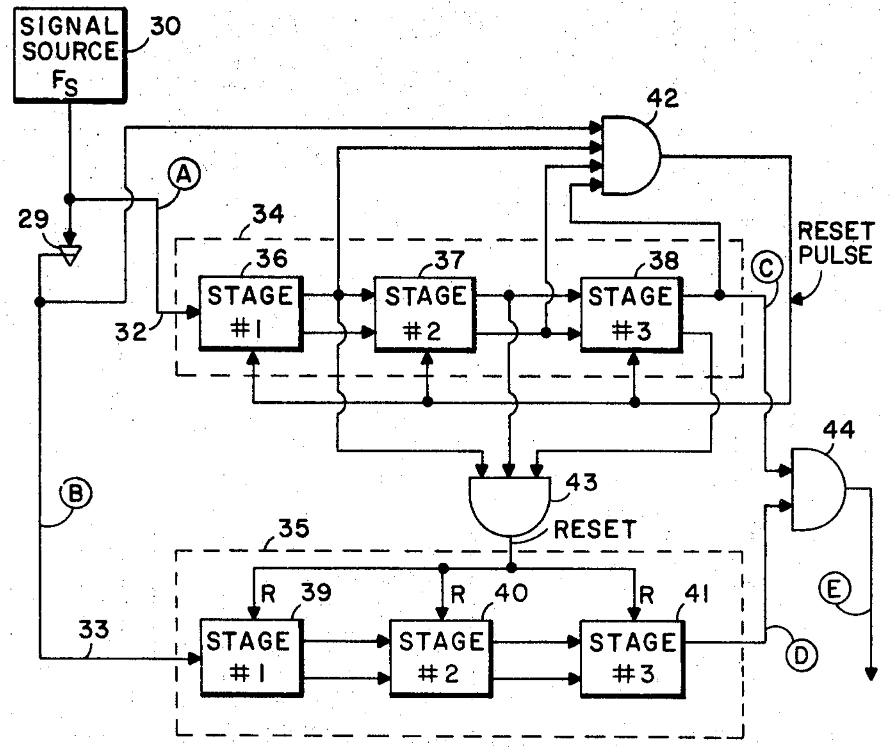
FIG. 3 is a block diagram of a form of the invention which will function to divide the frequency of the input signal by 5/2.
Figure 5:
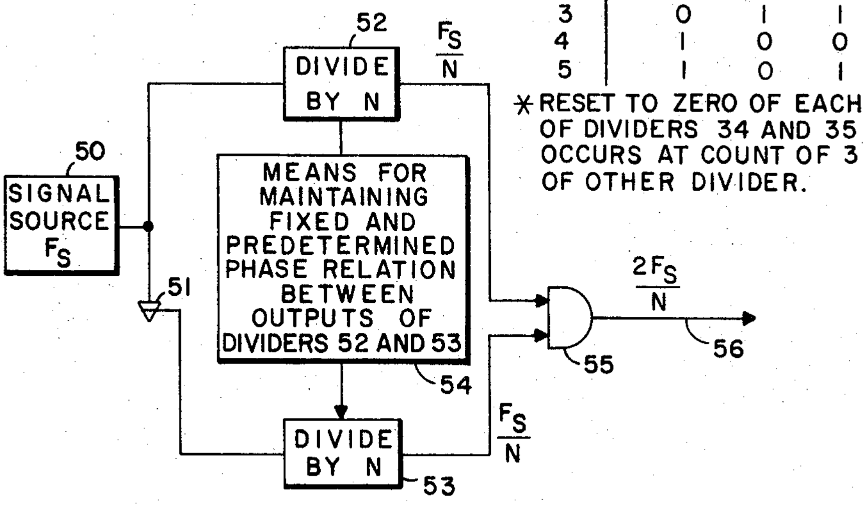

FIG. 3*a* is a truth table showing the condition of the various stages of the binary counters of FIG. 3 for various counts contained therein;

FIG. 4 is a set of waveforms showing the voltages at various points in the circuit of FIG. 3; and FIG. 5 is a logic diagram of the generalized form of the invention.

Figures 1, 1A, 1B:
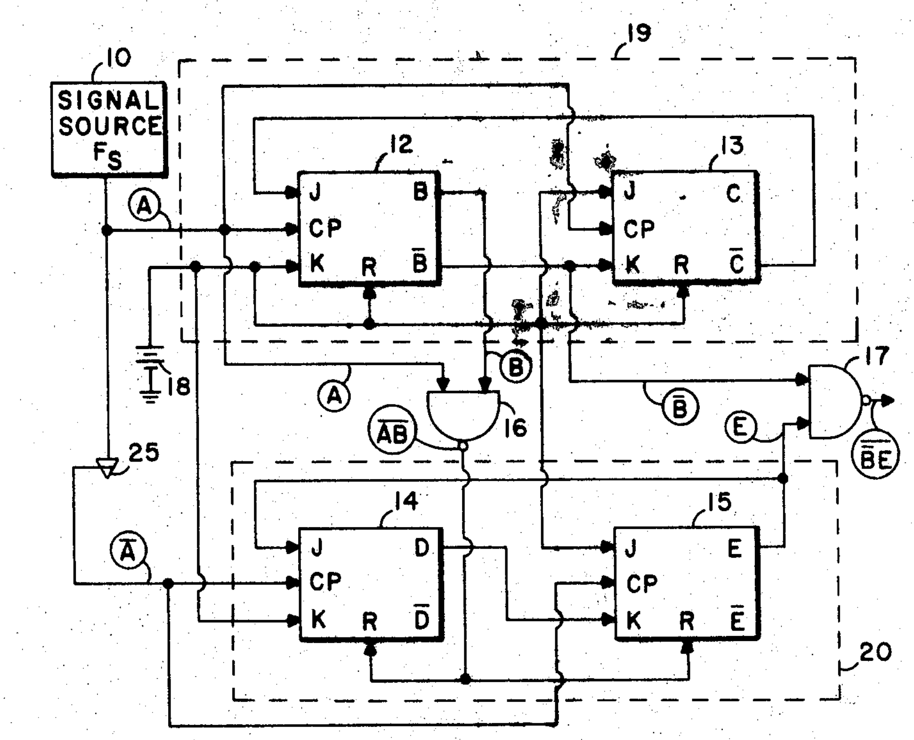

The specification will be organized in the following manner:

I—OPERATION OF DIAGRAM OF FIG. 1
- A—General Discussion
- B—Synchronization of Dividers 19 and 20 of FIG. 1

II—OPERATION OF DIAGRAM OF FIG. 3

III—OPERATION OF DIAGRAM OF FIG. 5

I—OPERATION OF DIAGRAM OF FIG. 1

A—General Discussion

Referring now to FIG. 1 there is shown a logic diagram for dividing the frequency $F_s$ of the signal from source 10 by 1-½ Generally the circuit of FIG. 1 consists of two frequency dividers; one within the dotted block 19 and the other within the dotted block 20.

Each of the frequency dividers 19 and 20 functions to divide the frequency $F_s$ by three. However, the duty cycles of the outputs of the two frequency dividers 19 and 20 are unbalanced and related to each other in such a manner that coincident upper levels of the outputs of the two frequency dividers occur at twice the frequency of the output of either divider. Thus the overall result is an output frequency which is 2/3 $F_s$.

Figure 2:
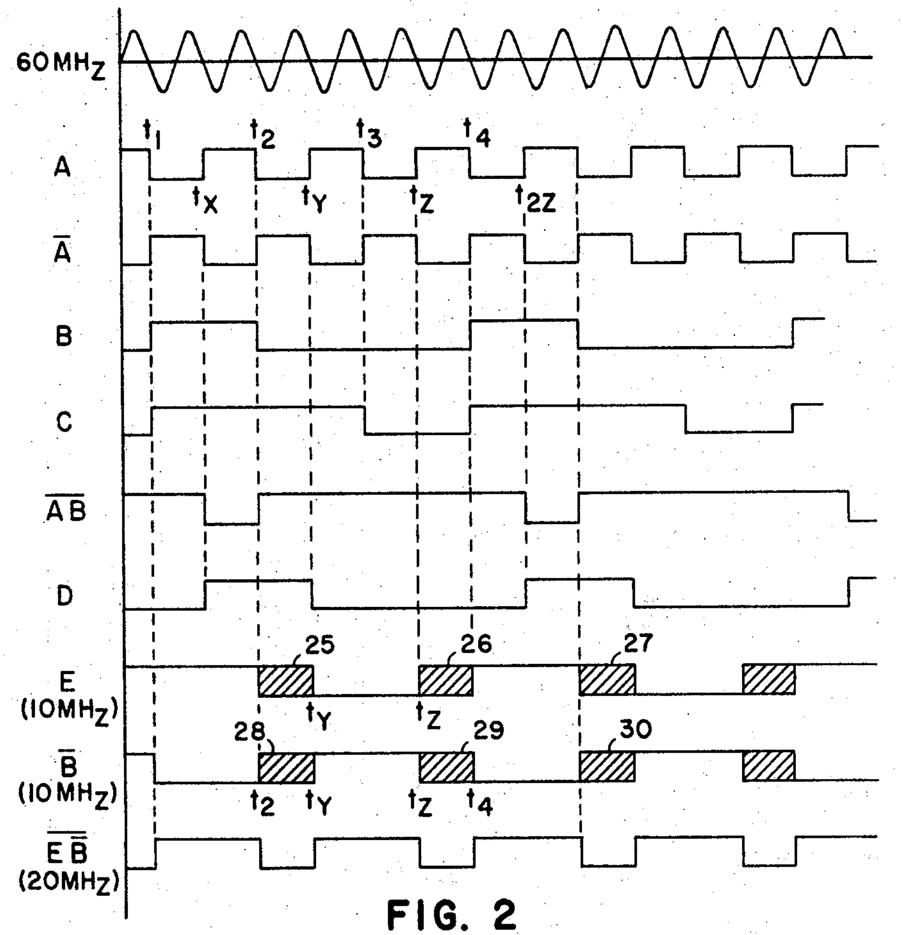
FIG. 2 is a set of waveforms showing the voltage waveforms at various indicated points in the circuit of FIG. 1.

Reference is made to the waveforms E and $\overline{B}$ of FIG. 2 which show the outputs of the two frequency dividers. It can be seen that the waveform E is taken from the output E of JK flip-flop 15 of divider 20 (FIG. 1), and that the waveform $\overline{B}$ is taken from the output B of the JK flip-flop 12 of the upper frequency divider 19 of FIG. 1. An examination of the waveforms E and $\overline{B}$ of FIG. 2 shows that the duty cycle thereof is unbalanced. More specifically, as herein defined duty cycle means the ratio of time that the output signal is in its upper level to the time that the output signal is in its lower level. It can be seen from the waveforms E and $\overline{B}$ of FIG. 2 that the duty cycle, as defined above, is greater than unity. By providing proper phasing between said waveforms E and B the upper level portions of waveform E identified by reference characters 25, 26, and 27 can be made to coincide with those upper level portions of waveform $\overline{B}$ identified by reference characters 28, 29, and 30. A NAND gate 17 in FIG. 1 functions to respond to the aforementioned coincident upper levels of the two waveforms E and $\overline{B}$ to produce the output waveform shown in FIG. $\overline{E}\,\overline{B}$ of FIG. 2, which can be seen to be twice the frequency of the waveforms E and $\overline{B}$.

A more detailed description of the operation of the circuit of FIG. 1 is as follows. The output signal from source 10, represented by waveform A of FIG. 2, is supplied directly to the CP inputs of JK flip-flops 12 and 13 of divider 19, and the inverted form of the signal from source 10, represented by waveform $\bar{A}$ of FIG. 2, is supplied through inverter 25 to the CP inputs of JK flip-flops circuits 14 and 15 of divider 20.

Consider first the operation of frequency divider 19 comprised of JK flip-flops 12 and 13.

In the waveform $\bar{A}$ of FIG. 2 assume that at time $t_1$ the outputs B and C of flip-flops 12 and 13 both have 1's thereon, as shown in waveforms B and C of FIG. 2, said 1 being produced by the negative transition of waveform A at time $t_1$.

At the next negative transition of waveform A, which occurs at time $t_2$, the output B of JK flip-flop 12 will change to a 0 because of the positive voltage from battery source 18 which is supplied to the input K of flip-flop 12. It is to be noted that at time $t_2$ the output of $\bar{C}$ of JK flip-flop 13 which is connected back to the J input of flip-flop 12, contains a 0. Under this condition the positive voltage supplied from battery source 18 to the K input of flip-flop 12 will control the condition to which said flip-flop 12 will go at time $t_2$ in response to the negative transition of waveform A supplied to the CP input.

If, on the other hand, a 1 had been supplied to the J input of flip-flop 12 at time $t_2$, then flip-flop 12 would have changed from whatever stage it was in to the opposite stage. The foregoing is a characteristic of the JK flip-flop and applies also to flip-flops 13, 14, and 15.

However, as discussed above, at time $t_2$, a 0 was in fact being supplied to the J input of flip-flop 12 so that the 1 supplied to the K input controlled and a 1 was produced at the $\bar{B}$ output of flip-flop 12.

It is to be noted that after time $t_2$ the C output of flip-flop 13 remains a 1 since the $\bar{B}$ output of flip-flop 12 which is connected to the K input of flip-flop 13, did not change to a 1 until immediately after, and as a result of, the negative transition of the waveform A at time $t_2$.

At time $t_3$ in FIG. 2 the next negative-going edge of waveform A will trigger flip-flop 13 via input CP to change the output C thereof from a 1 to a 0 due to the fact that the $\bar{B}$ output of flip-flop 12 was a 1 at time $t_3$. More specifically, at time $t_3$ a 1 existed on both the J and K inputs of flip-flop 13, from the battery source 18 and the $\bar{B}$ output of flip-flop 12, respectively. As discussed above, however, it is a characteristic of a JK flip-flop that when 1's appear on both the J and K inputs a negative transition supplied to the CP input will cause the flip-flop to change from whatever state it is in to the other state. In the particular instance being discussed the flip-flop 13 was in the J state, and there was a 1 on the C output thereof. Thus at time $t_3$ when the negative transition of waveform A was supplied to the CP input of flip-flop 13, said flip-flop 13 switched its state to produce a 0 on the C output thereof.

Also at time $t_3$ the B output of flip-flop 12 remains at 0 because of the 1 supplied to its K input from battery source 18.

Thus immediately after time $t_3$ the output of B is a 0 and the output of C is also a 0, as shown in the waveforms B and C of FIG. 2. At time $t_4$, when the next negative transition of waveform A occurs, the flip-flop 12 will change states to produce a 1 on its output B since $\bar{C}$ of flip-flop 13 has a 1 thereon at time $t_4$.

Also at time $t_4$ the output at C will change to a 1 because of the 1 supplied to the J input of flip-flop 13 from battery source 18. It is to be noted that immediately prior to time $t_4$ there had been a 1 on the $\bar{B}$ output of flip-flop 12 so that at time $t_4$ both the J and K inputs of flip-flop 13 have 1's thereon. Thus the flip-flop 13 will change states.

As a result of the negative transition of waveform A at time $t_4$, both of the outputs B and C of flip-flop 13 are caused to have 1's thereon and the cycle is complete, as shown in the waveforms B and C of FIG. 2.

The operation of the other frequency divider 20 of FIG. 1 is much the same as the operation of the frequency divider 19. One principal difference between the frequency dividers 19 and 20 is that the input signal clock pulse supplied to divider 20 from source 10 is the inverted form of the same input signal supplied to divider 19. The use of the inverted waveform provides for symmetry of output waveforms, which symmetry will be more apparent from the following discussion. In brief, however, such symmetry is obtainable since the frequency dividers divide by an odd number, e.g. by three in the circuit of FIG. 1, and the midpoint between each successive third cycle of the clock pulse occurs at a period equal to 1½ cycles of the waveform A. Since the frequency dividers are operated on the negative transitions of the clock pulse, it is necessary to invert the waveform A in order to supply to the frequency divider 20 negative transitions of the clock pulse which fall midway between the negative transition clock pulses supplied to the frequency divider 19.

The operation of the frequency divider 20 is as follows. Assume that at time $t_x$ both the D and E outputs of counter 20 have 1's thereon. At time $t_y$ both the D and the E outputs will change to 0's in response to the negative transitions of the $\bar{A}$ waveform of FIG. 2, as shown in the waveforms E and D of FIG. 2. More specifically, at time $t_y$ D goes to 0 since both the J and K inputs of flip-flop 14 have a 1 thereon and said flip-flop 14 will change states in response to the negative transition of waveform $\bar{A}$ at time $t_y$. The output E of flip-flop 15 will change to a 0 since both the J and K inputs have 1's thereon at the time $t_y$, when the negative transition clock pulse is applied to input CP.

It is to be specifically noted that the K input of flip-flop 14 and the J input of flip-flop 15 have 1's thereon because they are connected to the battery source 18.

At time $t_z$ the D output will remain a 0 and the E output will change to a 1. More specifically, the D output remains a 0 because of the 1 supplied to the K input of flip-flop 14 from battery source 18. The E output, which is connected to the J input of flip-flop 14, had a 0 thereon immediately prior to time $t_z$.

At time $t_z$, in response to the negative transition of waveform $\bar{A}$, the E output changes to a 1, also because of the 1 supplied thereto from the positive battery source 18.

At time $t_{2z}$, the D output changes to a 1 and the E output remains a 1. Specifically the D output changes to a 1 because of the existing 1 on the E output which is supplied back to the J input of flip-flop 14. The E output remains a 1 because of the 1 supplied the J input of flip-flop 15 from positive battery source 18.

The truth table for the operation of divider 20 is shown in FIG. 1*b*.

I—B—Synchronization of Dividers 19 and 20

Some means are required to synchronize the operation of frequency divider 19 with that of frequency divider 20 in order that the output waveforms E and $\bar{B}$, as shown in FIG. 2, have the proper phase relation with each other. More specifically, as discussed above, the duty cycle of waveforms E and $\bar{B}$ is unequal. The two waveforms are in their upper level a greater amount of time than they are in their lower level. Because of this unbalanced duty cycle, the two waveforms can be caused to have a phase relation whereby the periods of time that each waveform is in its upper level can be caused to span the shorter time periods when the other waveform is in its lower level. Thus, for example, between time $t_2$ and $t_4$ the waveform $\bar{B}$ can be caused to symmetrically span the lower level portion of the waveform E occurring between times $t_y$ and $t_z$.

It can be seen from waveforms E and $\bar{B}$ that there exists two periods of time $t_2 - t_y$ and $t_z - t_4$ when both waveforms are in their upper level.

Synchronization between frequency dividers 19 and 20 is obtained by means of NAND gate 16 to which waveforms A and B of FIG. 2 are supplied. Upon coincidence of waveforms A and B in their upper levels there is produced a lower level pulse $\bar{B}$ at the output of NAND gate 16, as shown in the waveform $\overline{AB}$ of FIG. 2. The negative transition of such waveform $\overline{AB}$ functions to reset both flip-flops 14 and 15 so that the outputs D and E thereof have 1's thereon. Theoretically such resetting of flip-flops 14 and 15 would only be necessary one time, at the beginning of the operation of the circuit. Thereafter synchronization should be automatically maintained.

A suitable gating means 17 of FIG. 1 is responsive to the waveforms E and $\overline{B}$ to produce an output signal which switches to a lower level in response to the coincidence of the upper levels of waveforms E and $\overline{B}$. The output of NAND gate 17 is shown in the waveform $\overline{E\,\overline{B}}$ of FIG. 2. Such output can be seen to have a frequency which is twice the frequency of either the waveforms E and $\overline{B}$. Since the frequency of waveforms E or $\overline{B}$ are equal to $F_s/3$, it follows the frequency of waveform $\overline{E\,\overline{B}}$ is equal to $F_s$ divided by 3/2, or 2/3 $F_s$.

Thus the frequency $F_s$ of the input signal of FIG. 1 has been effectively divided by 3/2.

II—OPERATION OF DIAGRAM OF FIG. 3

FIG. 3 shows a circuit capable of dividing the frequency $F_s$ of the signal from source 30 by 5/2 and consists of two frequency dividers 34 and 35 each of which is capable of dividing by 5.

Each of the frequency dividers 34 and 35 can be a three stage binary counter connected in such a manner that the count recycles every five input pulses in accordance with the truth table of FIG. 3*a*. The details of the frequency dividers 34 and 35 are not shown since many types of binary counters are suitable for use therein. FIG. 3 purports to show only the general case of a divide by 5/2 circuit.

As in the case of FIG. 1 a prerequisite characteristic of the frequency dividers 34 and 35 is that they have a two level output signal in which the duty cycle is unbalanced, i.e. in which the output signal is in one level a greater length of time than it is in the other level for each cycle of operation. Consider first the operation of the frequency divider 34.

It can be seen from the truth table of FIG. 3*a*, which applies to both counters 34 and 35, although not synchronously, that during the first four counts of any given cycle the output of stage 3 of frequency divider 34 is a 0 and then during the fifth input pulse from signal source 30 the outputs of the third stage of the binary counter 34 goes to a 1. The next following count reinitiates the cycle of operation and all three stages of the counter 34 go to 0 as shown in the truth table of FIG. 3*a*. Thus the duty cycle of the output signal is four to one. More specifically the output of stage 3 is at a 0 for four cycles of the input signal from source 30 and is at a 1 during one cycle of the input signal from source 30, during each five count cycle of operation. The output of stage 3 of frequency divider 34 is shown in waveform C of FIG. 4. The waveform A of FIG. 4 represents the input signal from source 30 of FIG. 3.

The operation of the other frequency divider 35 of FIG. 3 is much the same as frequency divider 34 except that it is operated by the inverted form of the signal from source 30 as shown in waveform B of FIG. 4. The use of the inverted waveform permits the entering of a 1 in stage 3 of flip-flop divider 35 at time $t_2$ which falls precisely midway between times $t_1$ and $t_3$ of waveform C, when a 1 occurs at the output of stage 3 of frequency divider 34. This particular phase relation of the output signal of the third stages of frequency dividers 34 and 35 permits the generation of waveform E of FIG. 4 at the output of AND gate 44 (FIG. 3), in response to waveforms C and D which are supplied thereto. It is apparent that if $t_2$ did not fall midway between $t_1$ and $t_3$, that waveform E of FIG. 4 would contain a substantial amount of distortion.

III—OPERATION OF DIAGRAM OF FIG. 5

FIG. 5 shows the general logic diagram for dividing a frequency by a factor N/2 where N is any integer. As in the case of FIGS. 1 and 3, the diagram of FIG. 5 consists of two dividers 52 and 53, each of which divide the input signal frequency $F_s$, from source 50, by an odd integer. The dividers 52 and 53 must be constructed so that the output signals supplied to AND gate 55 have an unbalanced duty cycle wherein the output signal is at one level a greater length of time than at the other level during each cycle of operation. A means 54 is provided which maintains the proper phase relationship between the operation of dividers 52 and 53 such that the phases of their output signals are substantially 180° apart, as discussed in connection with the waveforms of FIGS. 2 and 4.

While the inverter 51 is provided in FIG. 5 for the same general purpose as inverters 25 and 29 of FIGS. 1 and 3, that is to maintain a 180° phase relation between the output signals of the two frequency dividers, such inverter becomes increasingly less necessary as N increases since the amount of distortion will decrease as N increases.

Also the inverter 51 could be eliminated, and a 180° phase relationship still maintained between dividers 52 and 53 if one divider were constructed to operate on negative transitions of the input signals and the other divider upon positive transitions of the input signal.

It is to be understood that the forms of the invention shown and described herein are but preferred embodiments thereof. Various changes and modifications can be made in the logic diagrams without departing from the spirit or scope of the invention.

We claim:

1. Fractional frequency divider means comprising:

first means responsive to an input signal to divide the frequency thereof by an odd integer N to produce a first, substantially two level output signal which is in one level a greater time interval than the other level each cycle of operation;

second means responsive to said input signal to divide the frequency thereof by N to produce a second, substantially two level output signal which is in one level a greater time interval than the other level each cycle of operation;

means for synchronizing said first and second means to substantially time center the said one level of greater time duration of said first two level output signal with said other level of lesser time duration of said second two level output signal; and means for detecting coincidence between said levels of greater time duration of said first and second output signals.

2. Fractional frequency divider means comprising:

first and second frequency dividers each constructed to divide the frequency of an input signal by an odd integer N to produce first and second substantially two level output signals, with a first level of each cycle of said output signals comprising more than half the period of said cycles;

means for synchronizing said first and second output signals to time span each first level portion of a cycle of said first output signal across two adjacent first level portions of said second output signal; and means for detecting coincidence of said first level portions of said first and second output signals.

3. Fractional frequency divider means comprising:

first means responsive to an input signal to divide the frequency thereof by an odd integer N to produce a first signal with each cycle thereof consisting of a first portion above a first given polarity and a second portion below said given polarity and with said first portion comprising more than one half of each cycle period;

second means responsive to said input signal to divide the frequency thereof by N to produce a second signal with each cycle thereof consisting of a first portion above a second given polarity and a second portion below said given polarity, and with said first portion comprising more than one half of each cycle period;

means for synchronizing said first and second frequency divider means to substantially time center the said first portions of said first output signal with said second portions of said second output signal; and means for detecting coincidence between said first portions of said first and second output signals.

4. Fractional frequency divider means comprising:

first and second frequency dividers each constructed to divide the frequency of an input signal by an odd integer N to produce first and second output signals with each cycle thereof consisting of a first portion above a reference polarity and a second portion below said reference polarity; with said first portions comprising more than one half of each cycle period;

means for synchronizing said first and second output signals to time span each first portion of each cycle of said first output signal across two adjacent first portions of said second output signal; and means for detecting coincidence of said first portions of said first and second output signals.